United States Patent [19]
Ault et al.

[11] 3,836,373
[45] Sept. 17, 1974

[54] METHOD OF PREPARING PORCELAIN ENAMEL FRIT FOR DRY PROCESS ENAMELING

[75] Inventors: Alfred S. Ault, River Forest; Le Roy A. Johnson, Evanston; Harry J. Van Dolah, Wheaton, all of Ill.

[73] Assignee: Eagle-Picher Industries, Inc., Cincinnati, Ohio

[22] Filed: Feb. 2, 1961

[21] Appl. No.: 86,570

[52] U.S. Cl. ..................... 106/48, 65/33, 106/39.8, 117/23, 117/129
[51] Int. Cl. ........................... C03c 5/02, C03c 3/22
[58] Field of Search.......... 106/52, 48, 54, 39 DVC; 117/129, 23

[56] References Cited
UNITED STATES PATENTS

| | | | |
|---|---|---|---|
| 2,588,250 | 3/1952 | Kopelman et al..................... | 106/48 |
| 2,691,855 | 10/1954 | Armistead............................. | 106/39 |
| 2,795,506 | 6/1957 | Sweo et al. ......................... | 106/48 |
| 2,920,971 | 1/1960 | Stookey.............................. | 106/39 |
| 2,933,857 | 4/1960 | Stookey.............................. | 106/52 |
| 2,952,558 | 9/1960 | Tafel.................................. | 117/129 |
| 2,972,543 | 2/1961 | Beals et al. ......................... | 106/48 |

*Primary Examiner*—Helen M. McCarthy
*Attorney, Agent, or Firm*—Hill, Gross, Simpson, Van Santen, Steadman, Chiara & Simpson

EXEMPLARY CLAIM

1. The method of making an improved titania opacified porcelain enameling frit for dry process application which comprises fritting a molten silicate glass composition containing from about 8 to 24 percent titanium dioxide and thereafter heat treating the frit particles at a temperature of at least 100°F above the interferometer softening point but below the point at which said frit particles become tacky until nucleation of titanium dioxide occurs in the frit particles but before relatively large crystals are formed in said frit particles.

5. A porcelain enamel frit for dry process application comprising a matrix of acid resistant silicate glass containing from about 8 to 24 percent titanium dioxide, said glass having nuclei consisting essentially of titania distributed therethrough, said nuclei being very substantially smaller than the titanium dioxide crystals existing in a titanium dioxide opacified enamel produced by dry process enameling.

17 Claims, No Drawings

METHOD OF PREPARING PORCELAIN ENAMEL FRIT FOR DRY PROCESS ENAMELING

The present invention relates to porcelain enameling of metals, and to compositions used in this type of process.

One of the most convenient enameling procedures in use today involves the application of a dry enameling frit onto a hot casting so that the heat of the casting fuses the frit into a uniform film of enamel which readily bonds itself to the underlying surface when the enameled article is cooled. In order to produce a white color in the enamel, it is common to incorporate either an antimony or zirconium opacifier into the composition and to apply sufficient amounts of such opacified frits to produce a coating on the order of 40 to 50 mils in thickness. The use of antimony or zirconium opacifiers, however, in addition to requiring reasonably thick coatings, suffers from the further disadvantage that the resultant enamels are not particularly acid resistant nor is the color as white as would be desired in many instances.

Some attempts have been made to use titanium dioxide because of its extremely high index of refraction, which results in better hiding power and higher opacity. While this material can be handled reasonably well in a wet process of application, the conventional methods for opacifying frit with titanium dioxide leave much to be desired when such compositions are used in the dry enameling process, particularly on cast iron. Titanium containing enamels frequently produce a mottled appearance which is highly objectionable in the finished article. Furthermore, the color achieved in the enamel coating is not the desired blue-white cast but more often is yellowish. In addition, the reflectivity of the enamel surface is not as high as would be desired in high quality enameling.

In view of the foregoing, an object of the present invention is to provide an improved method for producing titanium opacified enameling frit which results in the production of a completely satisfactory white enamel coating.

Another object of the invention is to provide an improved process for the production of frit containing titanium dioxide which results in the production of a porcelain enamel coating having improved color and reflectivity.

Still another object of the invention is to provide an improved porcelain enameling frit composition containing titanium dioxide.

Another object of the invention is to provide an improved dry enameling process, particularly for cast iron.

We have now found that improved porcelain enamel coatings can be produced by employing a titanium dioxide containing frit which has been heat treated during its process of manufacture under conditions sufficient to cause at least incipient crystallization of titanium dioxide in the glass. The range of heat treating temperatures extends from a temperature more than 100°F. above the softening point of the glass, but not more than 400°F. above the softening point of the glass as measured by an interferometer.

The overall process of the present invention proceeds as follows. The glass composition, containing suitable amounts of titanium dioxide, is smelted at an appropriate temperature, usually on the order of 2500°F. Then, the molten glass is quenched, resulting in the production of a clear glass composition having a temperature below 800°F. At the time of quenching, the glass breaks up into particles which are at least translucent, i.e., they permit the transmission of light even if they are not completely transparent. The fritted particles are preferably relatively small, being not more than one-fourth inch in thickness and usually less than one-eighth inch, so as to facilitate their being quickly reheated in the subsequent nucleation step about to be described.

The glass particles resulting from the quenching are then heated to a temperature at which nucleation of titanium dioxide exists. Nucleation occurs when a number of atoms present in a disordered state, aggregate to form centers of crystallization. The size of the nuclei is generally believed to be on the order of 0.005 to 0.010 micron. The temperature of nucleation is usually about 250°F. below the point where crystallization can take place. The minimum temperature for heat treatment is well above the softening point for the glass, and is usually at least 140° above the softening point as determined by an interferometer. The maximum temperature is, as stated previously, about 400°F. above the interferometer softening temperature. For best results, the temperature should be below the point where tackiness occurs in the glass.

For the titanium dioxide containing frit of the present invention, treatment time of one minute to twenty-five minutes is sufficient to achieve the desired nucleation. A time not in excess of fifteen minutes is definitely preferred. It should be noted that it is not necessary, nor even desirable that all of the titanium dioxide in the composition be completely crystallized at this stage. As long as there are some nuclei of titanium dioxide provided in the glass, the improved results of the present invention will be obtained. The existence of such nuclei can be determined physically by the occurrence of a milky white color in the particles, and more positively by X-ray diffraction analysis.

After the heat treatment has occured, the particles can be ground to suitable frit size and screened. Generally, we prefer to employ a frit which passes almost entirely through a 10-mesh screen, and of which 20 percent is retained on a 200-mesh screen.

The frit which results consists of particles of a glass matrix containing embedded therein minute titanium dioxide crystals. In this form, the frit can be applied directly to heated metal objects maintained at temperatures ranging from about 1400° to 1800°F., and preferably at 1600° to 1700°F. The frit is applied to the hot metal articles through a screen in the usual manner and fuses to a uniform enamel having substantially improved masking power, a blue-white cast, improved reflectivity, higher gloss, and better texture. Whereas in the case of antimony and zirconium opacified enamels, a thickness of 40 to 50 mils is common, we can secure a better quality porcelain enamel with coatings whose average thickness is only 25 mils, and may range from about 10 to 40 mils.

The improved frit of the present invention can be applied to any metal, but it provides particularly improved results for the dry process enameling of cast iron. With the improved frit, the porcelain enamel coating eliminates the discoloration and mottling which were characteristic of other titanium opacified procelain enamels when applied to cast iron by the dry process.

We believe that the improved results we have achieved in the application of titania frits by the dry process may be explained along the following lines. In ordinary enameling procedures, where the frit is deposited dry on the heated surface, there occurs a differential thermal analysis whereby the frit undergoes an endothermic change during nucleation and later an exothermic change when crystallization progresses. It is conceivable that we eliminate this endothermic change during the application of the dry powder to the hot surface by our preliminary heat treatment. If a regular titanium frit is heated too rapidly or at too high a temperature for too long a time, the crystals formed are objectionably large. By starting the recrystallization by heating to a point to produce seeding or nucleation, the subsequent crystals occur in the anatase or rutile form, or both, of a particle size on the order of 0.2 micron. This particle size provides the best opacifying properties and best color in the enamel coating.

While the principal utility of the frit of the present invention lies in its use in the final cover coat, the new frit is also usable in connection with ground coats. Such coats usually contain a combination of clay, glass, and iron, and are used to prevent surface oxidation. When the improved titanium dioxide frit of the invention is employed in such a ground coat in amounts ranging from about 60 to 85 percent, it has been found to reduce substantially the thermal crazing which was characteristic of many ground coats heretofore employed.

The same results are not achieved when the heat treatment is carried out below the temperature at which nucleation of titanium dioxide crystals occurs. For example, a glass composition containing titania and having a softening point of 950°F. as determined on an interferometer was heat treated at 800°F. for 16 hours. At the end of this time, the glass was still non-opaque and did not provide the improved procelain enamel which could be obtained with the same composition by heating it at 1100°F. for about 6 minutes. Similarly, the heat treatment of the same composition at 1000°F., or some 50° above the softening point, for a period of 6 minutes still resulted in a non-opaque material which did not have the improved properties of the frit of the present invention.

The improved results of the present invention may be obtained with a wide variety of compositions. A typical range of ingredients for a white titanium frit is given below.

| | | |
|---|---|---|
| $SiO_2$ | 20 – 55% | by weight |
| $TiO_2$ | 8 – 24% | |
| $B_2O_3$ | 5 – 25% | |
| $Na_2O$ | 0 – 25% | |
| $K_2O$ | 0 – 25% | |
| $Li_2O$ | 0 – 5% | |
| $ZnO$ | 0 – 5% | |
| $Al_2O_3$ | 0 – 4% | |
| $MgO$ | 0 – 3% | |
| $P_2O_5$ | 0 – 5% | |
| $F$ | 0 – 20% | |
| $ZrO_2$ | 0 – 10% | |

The following specific example illustrates the process specifically.

A glass composition was made up with the following analysis:

| | |
|---|---|
| $SiO_2$ | 43.20% |
| $B_2O_3$ | 18.04% |
| $P_2O_5$ | 1.15% |
| $ZnO$ | 0.85% |
| $Na_2O$ | 7.76% |
| $K_2O$ | 7.91% |
| $Li_2O$ | 0.84% |
| $F$ | 3.57% |
| $TiO_2$ | 18.52% |
| $Al_2O_3$ | 0 .23% |
| | 102.07 |
| Less $O_2$ for Fluorine | –2 .07 |
| | 100.00 |
| Interferometer softening point | 959°F. |

The material was smelted at a furnace temperature of about 2500°F. and then quenched to solidify the glass and to reduce its temperature to a value of about 500°F. The fritted particles which resulted were then heat treated at 1100°F. for 6 minutes, at which time they had assumed a milky color characteristic of nucleation of titania crystals. The heat treated particles were then ground to a particle size in which about 20 percent was retained on a 200-mesh screen.

The dry powder thus obtained was then sifted onto a hot cast iron surface which had a temperature between 1600° and 1700° F. The enamel coating which resulted was about 25 mils in thickness, had a uniform blue-white cast, excellent reflectivity, and excellent abrasion resistance.

It will be understood that modifications and variations may be effected without departing from the scope of the novel concepts of the present invention. For example, the improved frit can include coloring oxides, either in the original melt or in admixture with the dry frit.

We claim as our invention:

1. The method of making an improved titania opacified porcelain enameling frit for dry process application which comprises fritting a molten silicate glass composition containing from about 8 to 24 percent titanium dioxide and thereafter heat treating the frit particles at a temperature of at least 100°F above the interferometer softening point but below the point at which said frit particles become tacky until nucleation of titanium dioxide occurs in the frit particles but before relatively large crystals are formed in said frit particles.

2. The method of making an improved titania opacified porcelain enameling frit for dry process application which comprises fritting a molten silicate glass composition containing from about 8 to 24 percent titanium dioxide and thereafter heat treating the frit particles at a temperature of at least 100°F above the interferometer softening point but not more than 400°F above said softening point for a period of time sufficient to allow nucleation of titanium dioxide to occur in the glass particles but not long enough to allow relatively large crystals to form in said glass particles.

3. The method of making an improved titania opacified porcelain enameling frit for dry process application which comprises fritting a molten silicate glass composition containing from about 8 to 24 percent titanium dioxide, and thereafter heat treating the frit particles at a temperature of at least 100°F above the interferometer softening point but not more than 400°F above said softening point for a period of time of 1 to 25 minutes to cause nucleation of titanium dioxide in the glass particles.

4. The method of making an improved titania opacified porcelain enameling frit for dry process application which comprises fritting a molten silicate glass composition containing from about 8 to 24 percent titanium dioxide and thereafter heat treating the frit particles at a temperature of at least 100°F above the interferometer softening point but not more than 400°F above said softening point for a period of time of 1 to 15 minutes to cause nucleation of titanium dioxide in the glass particles.

5. A porcelain enamel frit for dry process application comprising a matrix of acid resistant silicate glass containing from about 8 to 24 percent titanium dioxide, said glass having nuclei consisting essentially of titania distributed therethrough, said nuclei being very substantially smaller than the titanium dioxide crystals existing in a titanium dioxide opacified enamel produced by dry process enameling.

6. A porcelain enamel frit for dry process application comprising a matrix of acid resistant silicate glass containing from about 8 to 24 percent titanium dioxide, said glass having nuclei consisting essentially of titanium dioxide distributed therethrough, said nuclei having a particle size of about 0.005 to 0.010 micron.

7. A procelain enamel frit for dry process application comprising a matrix of acid resistant silicate glass containing from about 8 to 24 percent titanium dioxide but no more than about 4 percent alumina, said glass having nuclei consisting essentially of titanium dioxide distributed therethrough, said nuclei being very substantially smaller than the titanium dioxide crystals existing in a titanium dioxide opacified enamel produced by dry process enameling.

8. A procelain enamel frit for dry process application comprising a glass composition having the following analysis:

| | | |
|---|---|---|
| $SiO_2$ | 20 – 55% | by weight |
| $TiO_2$ | 8 – 24% | |
| $B_2O_3$ | 5 – 25% | |
| $Na_2O$ | 0 – 25% | |
| $K_2O$ | 0 – 25% | |
| $Li_2O$ | 0 – 5% | |
| $ZnO$ | 0 – 5% | |
| $Al_2O_3$ | 0 – 4% | |
| $MgO$ | 0 – 3% | |
| $P_2O_5$ | 0 – 5% | |
| F | 0 – 20% | |
| $ZrO_2$ | 0 – 10% | | the titanium dioxide being present in the form of extremely minute nuclei in a vitreous glass matrix.

9. A porcelain enamel frit for dry process application comprising a glass composition having the following analysis:

| | | |
|---|---|---|
| $SiO_2$ | 20 – 55% | by weight |
| $TiO_2$ | 8 – 24% | |
| $B_2O_3$ | 5 – 25% | |
| $Na_2O$ | 0 – 25% | |
| $K_2O$ | 0 – 25% | |
| $Li_2O$ | 0 – 5% | |
| $ZnO$ | 0 – 5% | |
| $Al_2O_3$ | 0 – 4% | |
| $MgO$ | 0 – 3% | |
| $P_2O_5$ | 0 – 5% | |
| F | 0 – 20% | |
| $ZrO_2$ | 0 – 10% | | the titanium dioxide being present in the form of minute nuclei in a vitreous glass matrix, said nuclei having a size of about 0.005 to 0.010 micron.

10. The method of enameling a ferrous surface which comprises heating the surface to a temperature of about 1400° to 1800°F, applying to the heated surface a silicate glass frit containing from about 8 to 24 percent titanium dioxide in the form of extremely finely divided nuclei in a vitreous glass matrix, thereby fusing the frit on said surface to produce an opaque porcelain enamel coating containing titanium dioxide crystals of a size substantially larger than the nuclei in said frit.

11. The method of enameling a ferrous surface which comprises heating the surface to a temperature of about 1400° to 1800°F, applying to the heated surface a silicate glass frit containing from 8 to 24 percent titanium dioxide in the form of finely divided nuclei having a size on the order of 0.005 to 0.010 micron in a vitreous glass matrix, thereby fusing the frit on said surface to produce an opaque porcelain enamel coating containing titanium dioxide crystals of a particle size of about 0.2 micron.

12. The method of claim 10 in which said frit has an analysis in the following ranges:

| | | |
|---|---|---|
| $SiO_2$ | 20 – 55% | by weight |
| $TiO_2$ | 8 – 24% | |
| $B_2O_3$ | 5 – 25% | |
| $Na_2O$ | 0 – 25% | |
| $K_2O$ | 0 – 25% | |
| $Li_2O$ | 0 – 5% | |
| $ZnO$ | 0 – 5% | |
| $Al_2O_3$ | 0 – 4% | |
| $MgO$ | 0 – 3% | |
| $P_2O_5$ | 0 – 5% | |
| F | 0 – 20% | |
| $ZrO_2$ | 0 – 10% | |

13. The method of making an improved titania opacified porcelain enamel frit for dry process application which comprises fritting a molten silicate glass composition containing from about 8 to 24 percent titanium dioxide by weight and thereafter heat treating the fritted glass particles at a temperature sufficiently above the glass frit softening point but below the temperature at which it becomes tacky for a time period sufficient to cause nucleation of at least some of the titanium dioxide therein.

14. An improved titania opacified porcelain enamel frit for dry process application which is prepared by a method which comprises fritting a molten silicate glass composition containing from about 8 percent to about 24 percent titanium dioxide by weight and thereafter heat treating the fritted particles at a temperature sufficiently above the frit softening point, but below the temperature at which they become tacky for a time period sufficient to cause nucleation of at least some of the titanium dioxide therein.

15. An improved titania opacified frit characterized by its ability to produce an enamel coating of improved color and reflectivity comprising a borosilicate glass matrix having minute nuclei of titanium dioxide dispersed therein, said frit containing between about 8 and about 24 percent titanium dioxide, said frit having the characteristic of forming larger opacifying crystals of titania in said matrix upon fusion of said frit on a heated substrate to form a porcelain enamel coating.

16. An improved titania opacified frit characterized by its ability to produce an enamel coating of blue-white color and improved reflectivity comprising a borosilicate glass matrix containing between about 8 and 24 percent titanium dioxide by weight, said matrix having minute nuclei of titanium dioxide dispersed therein, said frit having the characteristic of forming larger opacifying crystals of titanium dioxide in said matrix upon fusion of said frit on a substrate to form a blue-white porcelain enamel coating.

17. An improved titania opacified frit characterized by its ability to produce an enamel coating of blue-white color and improved reflectivity comprising a borosilicate glass matrix having nuclei of titanium dioxide dispersed therein, said nuclei having a particle size of about 0.005 to 0.010 micron, said frit having the characteristic of forming larger opacifying crystals of titanium dioxide in said matrix upon fusion of said frit on a substrate to form a blue-white porcelain enamel coating.

* * * * *